US012511402B2

(12) United States Patent
Kim et al.

(10) Patent No.: US 12,511,402 B2
(45) Date of Patent: Dec. 30, 2025

(54) SECURITY ANALYSIS SYSTEM AND METHOD BASED ON NEGATIVE TESTING FOR PROTOCOL IMPLEMENTATION OF LTE DEVICE

(71) Applicant: Korea Advanced Institute of Science and Technology, Daejeon (KR)

(72) Inventors: Yongdae Kim, Daejeon (KR); CheolJun Park, Daejeon (KR); Sangwook Bae, Daejeon (KR); BeomSeok Oh, Daejeon (KR); Jiho Lee, Daejeon (KR); Mincheol Son, Daejeon (KR); Insu Yun, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 278 days.

(21) Appl. No.: 17/960,246

(22) Filed: Oct. 5, 2022

(65) Prior Publication Data
US 2023/0114705 A1 Apr. 13, 2023

(30) Foreign Application Priority Data

Oct. 7, 2021 (KR) .................. 10-2021-0133149
Jun. 3, 2022 (KR) .................. 10-2022-0068414

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .................. G06F 21/577; G06F 2221/034
See application file for complete search history.

(56) References Cited

U.S. PATENT DOCUMENTS

| | | | |
|---|---|---|---|
| 8,526,938 B1* | 9/2013 | Gardner | H04W 24/06 455/433 |
| 2016/0182619 A1* | 6/2016 | Mann | H04L 43/50 709/204 |
| 2020/0213854 A1* | 7/2020 | Kim | G06F 11/3006 |

OTHER PUBLICATIONS

Kim H, Lee J, Lee E, Kim Y. Touching the untouchables: Dynamic security analysis of the LTE control plane. In2019 IEEE Symposium on Security and Privacy (SP) May 1, 20199 (pp. 1153-1168). IEEE. (Year: 2019).*
"LTE; Evolved Universal Terrestrial Radio Access (E-UTRA) and Evolved Packet Core (EPC);User Equipment (UE) conformance specification; Part 1 Protocol conformance specification", ETSI, 3GPP TS 36.523-1 version 15.5.0 Release 15, 2019, 45 pages.
Hongil Kim et al., "Touching the untouchables Dynamic security analysis of the LTE control plane", IEEE Symposium on Security and Privacy, 2019, pp. 1153-1168, doi: 10.1109/SP.2019.00038, 16 pages.

* cited by examiner

Primary Examiner — James R Turchen
(74) Attorney, Agent, or Firm — Hayes Soloway P.C.

(57) ABSTRACT

Disclosed are a negative testing-based security analysis system for protocol implementation of an LTE device, and a method thereof. According to an embodiment, a negative testing-based security analyzing method for protocol implementation of an LTE device performed by a computer device includes redefining a state of user equipment (UE) as a security abstraction state for a negative test and composing a test case generation rule by analyzing a specification document in redefining the state of the UE as the security abstraction state.

10 Claims, 10 Drawing Sheets

Signal injection attacker

FIG. 8

| Specification | | | | | |
|---|---|---|---|---|---|
| Guideline (§5.2.1) | Except the messages ... below, no NAS signalling messages shall be processed by the UE.... unless the network has established secure exchange of NAS messages.... ... -Identity request-(if requested identification parameter is [IMSI]) | | | | |
| | State | Security Header Type | Message Type | IE | Value | MAC |
| | * | * | Identity Request | Identity Type 2 | not IMSI | * |
| Over-approximation (§5.2.2) | No-SC | 0 (no integrity protected) | Identity Request | Identity Type 2 | 0 (reserved) | plain |
| | N-SC | 0 (no integrity protected) | Identity Request | Identity Type 2 | 0 (reserved) | plain |
| | No-SC | 1 (integrity protected) | Identity Request | Identity Type 2 | 0 (reserved) | plain |
| | No-SC | 0 (no integrity protected) | Identity Request | Identity Type 2 | 2 (IMEI) | plain |
| | No-SC | 0 (no integrity protected) | Identity Request | Identity Type 2 | 0 (reserved) | broken |

SECURITY ANALYSIS SYSTEM AND METHOD BASED ON NEGATIVE TESTING FOR PROTOCOL IMPLEMENTATION OF LTE DEVICE

CROSS-REFERENCE TO RELATED APPLICATIONS

A claim for priority under 35 U.S.C. § 119 is made to Korean Patent Application No. 10-2021-0133149 filed on Oct. 7, 2021 and Korean Patent Application No. 10-2022-0068414 filed on Jun. 3, 2022, in the Korean Intellectual Property Office, the entire contents of which are hereby incorporated by reference.

BACKGROUND

Embodiments of the inventive concept described herein relate to a negative testing-based security vulnerability analysis method and system for solving specification issues, and more particularly, relate to a negative testing-based security analysis system and method for protocol implementation of an LTE device.

Defects present when a control plane protocol is implemented in an LTE device leads to security threats such as location exposure, eavesdropping, and denial of service. To find these flaws, when an invalid or forbidden message is entered, it is required to test whether a device correctly rejects the invalid or forbidden message. To this end, negative testing is efficient.

However, 3rd generation partnership project (3GPP) specification only provides a test for a case where a correct message is entered, and thus many vulnerabilities are being still discovered in devices. Nowadays, there is no equipment capable of performing the negative testing in a mobile communication market. Test cases are not well defined, and thus device manufacturers and test equipment manufacturers seldom perform security testing or perform limited and in-house testing.

Existing state definitions are not suitable for the security testing. In particular, REGISTERED/DEREGISTERED state or IDLE/CONNECTED state of each of Non Access Stratum (NAS) and Radio Resource Control (RRC) defined in the specification indicates only information about a connection state of user equipment (UE) and does not reflect information about the security state at all. On the other hand, the specification defines that operations of a device varies depending on a security context.

(Non-Patent Document 1) 3GPP. TS 36.523-1, v15.5.0. User Equipment (UE) conformance specification; Part 1: Protocol conformance specification, 2019.

(Non-Patent Document 2) H. Kim, J. Lee, E. Lee, and Y. Kim. Touching the untouchables: Dynamic security analysis of the LTE control plane. In IEEE Symposium on Security and Privacy, 2019.

SUMMARY

Embodiments of the inventive concept provide a negative testing-based security analysis system and method for protocol implementation of an LTE device, and more particularly, provide a negative testing technology capable of testing the implementation security of a control plane protocol for all LTE devices.

Embodiments of the inventive concept provide a security analysis system and method based on negative testing for protocol implementation of LTE device, which may solve issues of specifications, by extracting the content and format of a message, which is prohibited or should not be processed in the specification, through detailed specification document analysis, generating a test message such that one or more message components violate the specification based on a specification structure of a mobile communication control plane protocol, and performing testing in consideration of a state of a device in this process.

According to an exemplary embodiment, a negative testing-based security analyzing method for protocol implementation of an LTE device performed by a computer device includes redefining a state of user equipment (UE) as a security abstraction state for a negative test and composing a test case generation rule by analyzing a specification document in redefining the state of the UE as the security abstraction state.

The method may further include generating test cases in an over-approximated method depending on the test case generation rule, performing a preliminary over-the-air test by using the generated test cases, adjusting a preliminary oracle based on an abnormal behavior of implementation in a case of the preliminary over-the-air test, and when the UE returns a normal response, modifying an oracle or removing a non-negative test case from a set of the test cases generated in the over-approximated method. A negative test case may be finally obtained as a deterministic oracle.

The redefining of the state of the UE as the security abstraction state may include redefining the state of the UE based on a security context for each protocol.

The redefining of the state of the UE as the security abstraction state may include defining the state of the UE as NO-SC based on a security context for each protocol. The NO-SC may be in a state where all control plane messages are protected depending on an event that only an initial wireless connection between the UE and a base station is present and the security context is not present.

The redefining of the state of the UE as the security abstraction state may include defining the state of the UE as N-SC based on a security context for each protocol. The N-SC may be in a state where an AKA procedure is completed and an NAS security context is generated. An RRC messages may not be protected depending on an event that all NAS messages are protected and an RRC security context is not generated.

The method may further include extracting content and a format of a message, which is prohibited or should not be processed, from the test case generation rule obtained by analyzing the specification document and composing a test message based on the content and the format of the message extracted from the test case generation rule such that message components violate a specification. The test message may be used for negative testing of the UE based on the specification document.

According to an exemplary embodiment, a negative testing-based security analysis system for protocol implementation of an LTE device includes a state redefinition unit that redefines a state of a UE as a security abstraction state for a negative test and a test case generation rule composition unit that composes a test case generation rule by analyzing a specification document in redefining the state of the UE as the security abstraction state.

The system may further include a test case generation unit that generates test cases in an over-approximated method depending on the test case generation rule, a preliminary over-the-air test unit that performs a preliminary over-the-air test by using the generated test cases, a preliminary oracle adjustment unit that adjusts a preliminary oracle based on an abnormal behavior of implementation in a case of the preliminary over-the-air test, and a test case removal unit that that modifies an oracle or removes a non-negative test case from a set of the test cases generated in the over-approximated method, when the UE returns a normal response. A negative test case is finally obtained as a deterministic oracle.

The state redefinition unit may redefine the state of the UE based on a security context for each protocol.

According to an exemplary embodiment, a negative testing-based security analyzing method for protocol implementation of an LTE device performed by a computer device includes extracting content and a format of a message, which is prohibited or should not be processed, from a test case generation rule obtained by analyzing a specification document and composing a test message based on the content and the format of the message extracted from the test case generation rule such that message components violate a specification.

The test message may be used for negative testing of a UE based on the specification document.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 8 is a diagram illustrating a guideline for an ID request test message, according to an embodiment.

DETAILED DESCRIPTION

Hereinafter, embodiments of the inventive concept will be described with reference to accompanying drawings. However, embodiments to be described may be modified in the different forms, and the scope and spirit of the inventive concept is not limited by the embodiments to be described below. In addition, various embodiments are provided to describe the inventive concept more fully to those skilled in the art. For a clear description, forms, sizes, and the like of elements may be exaggerated in a drawing.

A technology of finding implementation vulnerabilities is essential for the security of an LTE device. Conformance testing supported by the specification is used to find incorrect parts in the implementation of a current device (i.e., a part implemented differently from the 3GPP specification document). However, most of conformance testing of 3GPP handles positive testing (i.e., a test of whether it is handled properly when a correct message is received). In other words, negative testing (i.e., an operation in the case where an invalid or forbidden message is received) is rarely performed. As a result, security vulnerabilities are constantly appearing.

The following examples present a negative testing-based security vulnerability analysis method and system to solve issues of the specification. In more detail, according to embodiments, it is possible to extract the content and format of a message, which is prohibited or should not be processed in the specification, through detailed specification document analysis, and to generate a test message such that one or more message components violate the specification based on a specification structure of a mobile communication control plane protocol. In this process, testing in consideration of a state of a device may be performed.

How to define a state where a device is to be tested based on whether a security context is present, how to generate a message used for negative testing based on a specification document, and how to handle a correct operation (oracle) of a device suitable for a specification for the message will be described below.

According to embodiments, it is possible to find and patch security vulnerabilities in protocol implementation for conventional mobile communication devices and newly released devices by using a negative testing-based security analysis system. In prototypes of the present embodiments, 26 implementation vulnerabilities were effectively found for 43 devices equipped with chipsets of 0.5 different baseband manufacturers.

Figure 1:
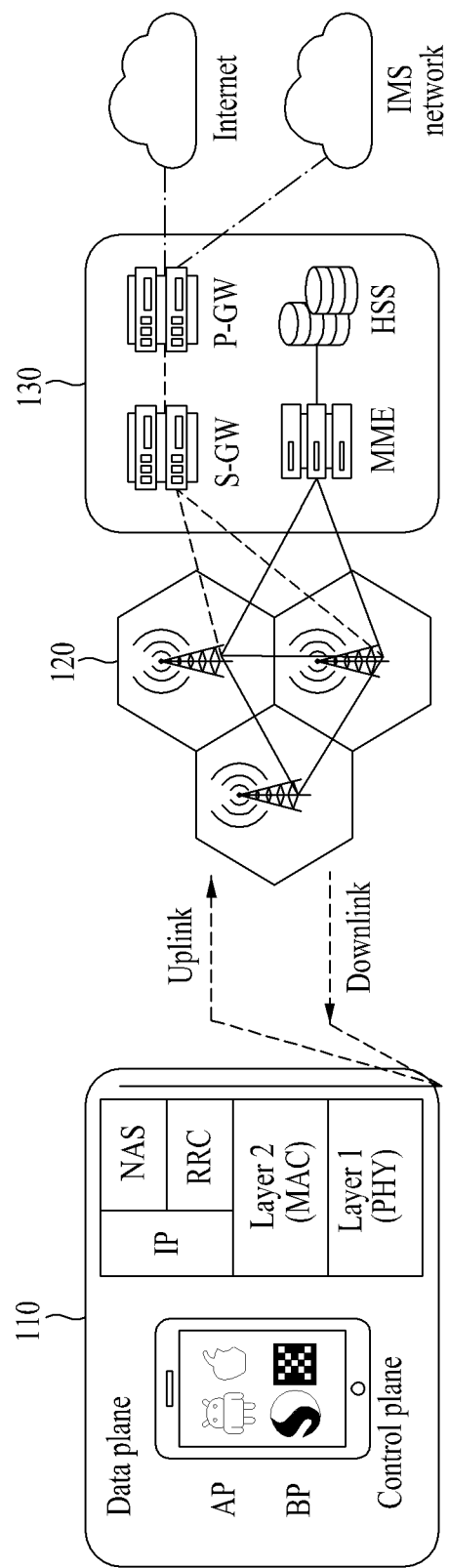
FIG. 1 is a diagram illustrating a structure of an LTE network, according to an embodiment.

FIG. 1 is a diagram illustrating a structure of an LTE network, according to an embodiment.

Referring to FIG. 1, an LTE network may include a user element (UE) 110, a base station (eNB) 120, and a core network (EPC) 130.

The UE 110 refers to a device, and indicates all devices located at the end of a cellular network that provides end users with voice and data cellular services. The UE 110 includes an application processor (AP) that processes an operating system and an application service, and a baseband processor (BP) that is in charge of mobile communication tasks such as wireless/digital signal processing, account management, encryption protection, and network authentication.

The eNB 120 provides a wireless connection between the UE 110 and the EPC 130 as a base station. Besides, for a safe and reliable cellular service, the eNB 120 provides confidentiality and integrity protection for controlling control plane messages and user data for each the UE 110 by using a dedicated radio resource control (RRC) protocol, while managing radio resources and radio connections.

The EPC 130 may be composed of a mobility management entity (MME) for user authentication and key/session/ID management, a gateway (GW) for managing IP data traffic, and a home subscriber server (HSS) for storing authentication information of a mobile subscriber, such as an international mobile subscriber identity (IMSI)) and an international mobile equipment identity (IMEI). In particular, the MME communicates with the UE 110 through a NAS protocol.

Basically, the control plane message consists of a message type, an information element, and a security component. Each message type has a unique functional purpose in a control plane message operation process. Moreover, the control plane message includes one or more information elements depending on the message type, and the information elements indicate detailed values and pieces of information required for a message operation. Finally, through a security header type, a message authentication number, and a sequence number, which are security components, the integrity of messages are protected and the messages are encrypted.

These embodiments constitute a test message obtained through specification analysis such that one or more message components violate the specification based on the content and format of a message that is prohibited or should not be processed in the specification.

Figure 2:
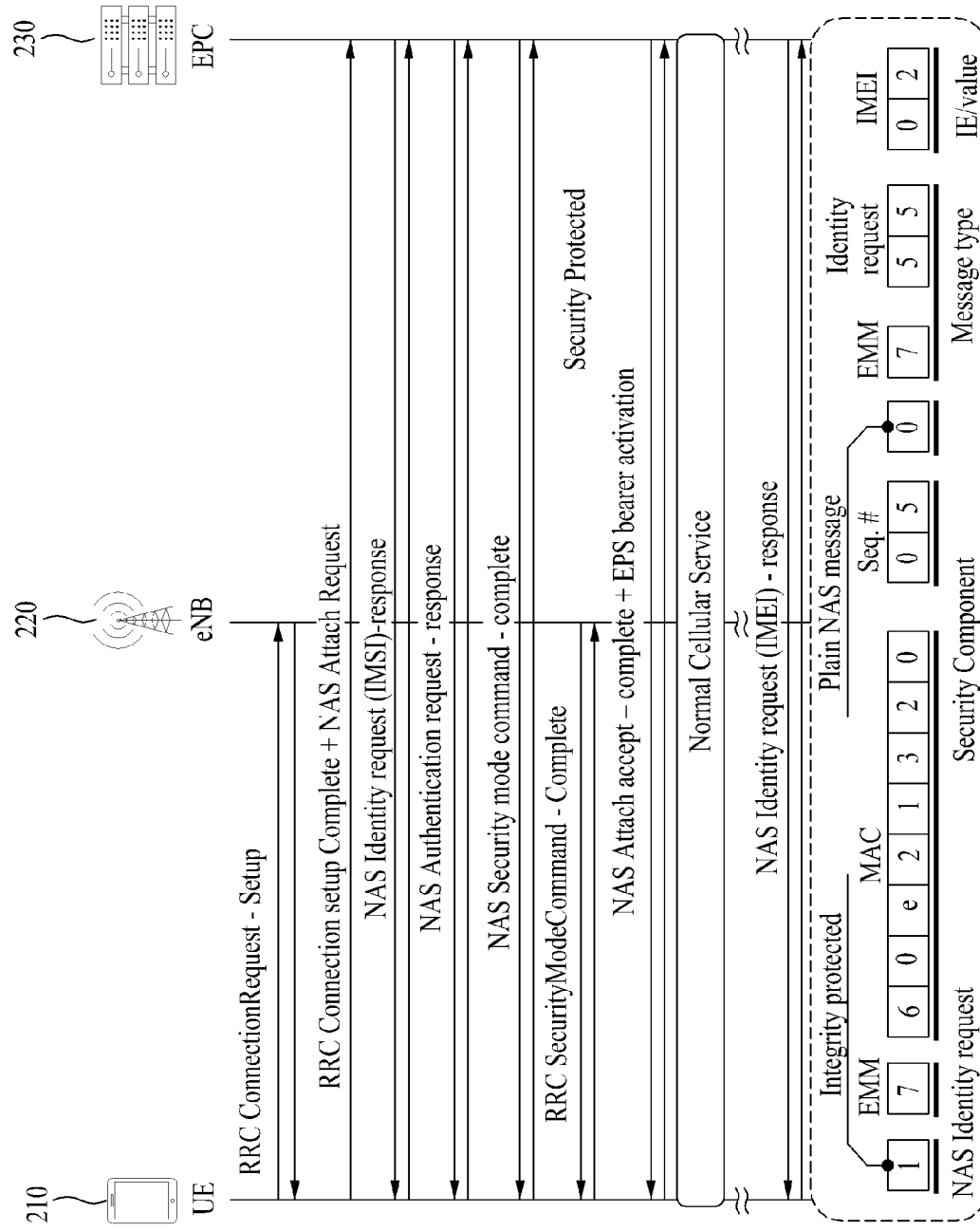
FIG. 2 is a diagram illustrating an LTE control plane procedure and message structure, according to an embodiment.

FIG. 2 is a diagram illustrating an LTE control plane procedure and message structure, according to an embodiment.

Referring to FIG. 2, an ATTACH procedure refers to an essential initial procedure for a UE 210 to use a cellular service upon powering on or returning from an airplane mode. The ATTACH procedure consists of several NAS and RRC procedures. First of all, the UE 210 establishes a wireless connection with an eNB 220 by exchanging an RRC Connection Request-Setup message. Next, an MME and the UE 210 establish a NAS security context by performing an EMM common procedure (i.e., control of an identification mode, an authentication mode, or a security mode). This procedure is initiated by the MME. In the identification procedure, the MME requests the UE 210 to transmit an identifier by exchanging a pair of Identity Request-Response messages with a user device. In an authentication and key agreement (AKA) procedure, the UE 210 and the MME authenticate each other through an Authentication Request-Response exchange. Then, the MME sets up a security algorithm used for encryption and integrity protection by exchanging NAS Security Mode Command-Complete. Setting up a security context encrypts NAS messages and protects the integrity thereof. Afterward, the eNB 220 and the UE 210 establish an RRC security context by exchanging RRC Security Mode Command-Complete. Finally, the MME provides a notification that an attach request has been accepted by sending an attach accept message. The attach accept message includes an evolved packet service (EPS) bearer activation required for services of a data plane. After the UE 210 responds with an Attach complete message, the ATTACH procedure is completed.

A control plane message consists of three parts: a message type, an information element (IE), and a security component. Each message type has a unique functional purpose within a control plane procedure. For example, an Identity Request message type is used in NAS identification procedure, and an RRC UEInformationRequest message type is transmitted by the eNB 220 to request a UE report. Depending on the message type, one or more IEs may be included in a message. The IE has a specific value depending on a defined length and a value type. After a message is configured, the integrity of the message is protected by using the security component and the message is encrypted by using the security component. This includes a security header type, a message authentication code (MAC), and a sequence number. The security header type defines a level of protection depending on a value (0) of No-Security, a value (1) of Integrity-Protection, or a value (2) of Integrity-Protection and Encryption. A message having a security header type of 0 indicates a normal message, an unprotected message, or an unauthenticated message. The message having a security header type of 0 is defined as a normal message, unprotected message, or unauthenticated message. On the other hand, messages having different security header types 1 to 5 indicate protected or authenticated messages when a valid MAC is present. As illustrated in FIG. 2, a message indicates a message type of "0x55" indicating that this is an identity request. An IE value indicates "0x02", which means that the requested identification type is IMEI. Because a value of the security header type is 1, the message includes MAC and a sequence number for integrity protection.

Figure 3A:
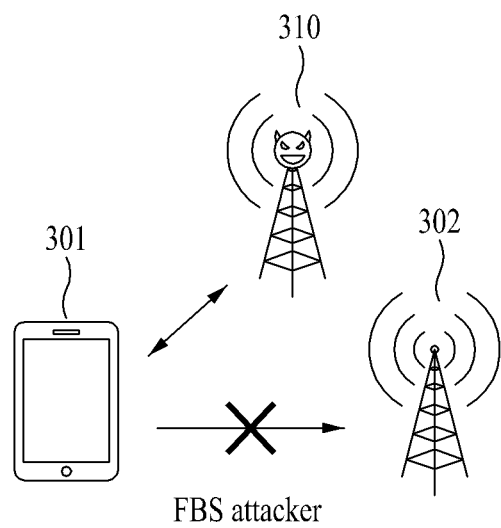
FIG. 3A is a diagram illustrating a fake base station (FBS) threat model in an LTE, according to an embodiment.
Figure 3B:
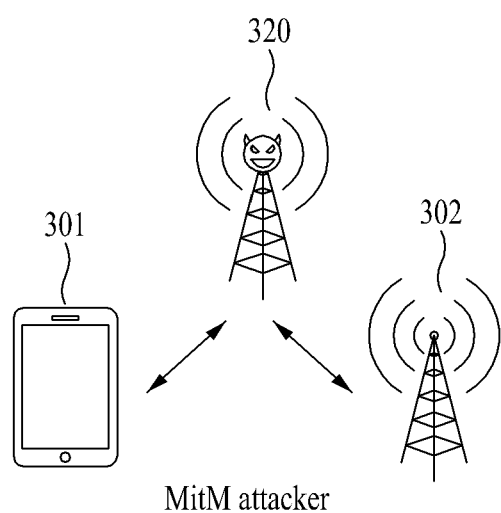
FIG. 3B is a diagram illustrating a man-in-the-Middle (MitM) threat model in an LTE, according to an embodiment.
Figure 3C:
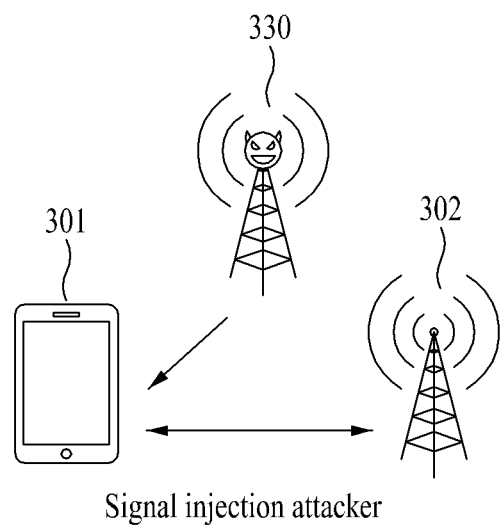
FIG. 3C is a diagram illustrating a message injection threat model in an LTE, according to an embodiment.

FIGS. 3A to 3C are diagrams for describing a threat model for a UE in an LTE, according to an embodiment. More specifically, FIG. 3A is a diagram illustrating a fake base station (FBS) threat model in an LTE, according to an embodiment; FIG. 3B is a diagram illustrating a man-in-the-Middle(MitM) threat model in an LTE, according to an embodiment; and, FIG. 3C is a diagram illustrating a message injection threat model in an LTE, according to an embodiment.

Referring to FIGS. 3A to 3C, there are three representative active threat models in an LTE network, and includes an FBS threat model, a MitM threat model, and a message injection threat model. An attacker may be present between a UE 301 and an eNB 302. Because all three threat models do not have a valid encryption key of a victim, only unprotected messages or messages having incorrect MAC values may be manipulated. However, because an FBS attacker 310 may not help the UE 301 to establish a security context with a network, the MitM attacker 320 and the message injection attacker 330 may transmit a message even after an AKA procedure. On the other hand, a message may be sent to only the UE 301 before the AKA procedure.

In a current specification, a conformance testing document (Non-Patent Document 1) is used to test UE implementation. This testing document focuses on a correct operation of the UE, and the UE properly handles a valid control plane message. This usually involves a positive test for dealing with cases having no error. However, a specification document rarely includes an invalid or forbidden message (i.e., a negative test). The message is very important for security. For example, when the UE unconditionally accepts the message without authentication, it may lead to serious threats such as identity theft or information leakage. Accordingly, it is important to test whether the UE successfully rejects such invalid messages related to security.

To prove that a negative case for security is insufficient in the conventional conformance specification document, the number of test scenarios that explicitly define the corresponding actions for messages without IE/value or integrity protection is calculated in the current conformance specification document (Non-Patent Document 1). Here, the specification document for version 15.5.0 will be reviewed. Only 3 negative test cases, 11 negative test cases, and 14 negative test cases among 993 test scenarios have been found to be related to RRC and NAS. To make matters worse, the conventional test scenarios deal with only limited message types. For example, conformance test in RRC includes only two message types for security. These scenarios determine whether the UE uses a correct security algorithm for integrity test and encryption (SecurityModeCommand), and whether the UE discards the UECapabilityEnquiry message having a wrong MAC. Moreover, these test scenarios do not cover unsafe behaviors explicitly prohibited in the specification document, and known implementation vulnerabilities reported in previous studies.

There have been various approaches to negative testing to discover vulnerabilities in UE implementations, but the various approaches have the following limitations.

Conventional studies consider only the limited state of an LTE network. In particular, the conventional studies consider only a state where the FBS attacker has a chance to transmit a hostile message to the UE (i.e. before the security context is set). However, recent studies have shown successful threat scenarios using new threat models such as MitM and message injection. However, an attacker is more powerful in transmitting a hostile control plane message even after the UE sets up a security context. An UE operation is stateful. Considering that the advanced threat model is capable of sending a message in any state of the UE, there is a need for a stateful negative test. Unfortunately, the conventional technology may not reflect such a strong attacker to the negative test.

A conventional task has focused on only limited components to build a negative message. The control plane message consists of three parts: a message type, an IE, and a security component. Because a search space is wide, LTE-Fuzz (Non-Patent Document 2), which is a cutting-edge tool, determines to change an IE by arbitrarily replacing a value of a commercial network log. This approach is effective in avoiding an absurd value that will be initially rejected. However, because the actual log depends on a network, it rarely includes forbidden messages or messages that are not frequently used in the network. For example, a Security Mode Command message of a commercial network does not include the security algorithm "EIA4-EIA7". An operation of EIA4-EIA7 is undefined and reserved for future expansion. In addition, it rarely includes EIA0 (null integrity), which is a forbidden security algorithm. In both cases, it is important to discover integrity bypass vulnerabilities. The LTEFuzz has failed to discover messages that are not transmitted by general networks.

According to an embodiment, the main goal is to build a negative test framework. It is possible to comprehensively test the UE based on the specification document, to use a deterministic oracle capable of interpreting the test result, and to build an enumerable test case. A test framework according to embodiments may be standardized to compensate for the lack of negative tests in the conformance specification document.

To thoroughly investigate prohibited or invalid situations that the UE is capable of encountering, a negative testing-based security analysis system according to an embodiment needs to have a comprehensive test case. To this end, because an operation of each message depends on a current state of the UE, it is necessary to consider a state and a test message at the same time. Moreover, unlike other tasks, the negative testing-based security analysis system according to an embodiment needs to consider all parts of message components, such as a message type, an IE, and a security component. The negative testing-based security analysis system according to an embodiment may reflect the strongest attacker of Dolev-Yao model. An attacker may eavesdrop, intercept, and synthesize all messages, and only the limitation is that the victim does not have a valid encryption key. This includes all conventional attacks such as FBS, MitM, and message injection on cellular networks.

The negative testing-based security analysis system according to an embodiment needs to support a deterministic oracle for each test case for a device whose operation complies with the specification. Finally, the negative testing-based security analysis system according to an embodiment desires to generate only enumerable test cases. Through this property, developers may efficiently test implementations and may easily determine the basic cause of discovered bugs. Accordingly, the negative testing-based security analysis system according to an embodiment selects important candidates from an almost infinite number of negative test case candidates.

To achieve the above-described goal, the following challenges needs to be addressed.

First of all, the security-related state of the specification document is defined. To fully evaluate the security of the UE, the negative test needs to consider various states. However, the conventional definition of state is inappropriate for a security test. In particular, the conventional specification document explicitly defines REGISTERED/DEREGISTERED and IDLE/CONNECTED states for each of NAS and RRC. However, this definition only indicates whether the UE is connected without considering a security context. Besides, the specification document describes an implicit state for identifying the behavior of the UE, based on the security context. For example, the UE does not need to respond to an Identity Request for requesting an IMEI before security activation, and this indicates an implicit state. However, because of this intrinsic nature, manufacturers arbitrarily implement these states as long as they are capable of passing a conformance test specification document. In brief, conventional definitions of explicit states and implicit states make it difficult to 1) list test cases for stateful security tests for negative tests, and 2) test a plurality of UEs regardless of default implementation.

Because LTE messages may be huge, it is impossible to test all possible negative cases. In particular, there are 118 message types in RRC and NAS, each message has a corresponding optional IE having 1,000 values or more. Accordingly, considering all components such as a message type, an IE, and a value, they have a huge number of combinations. Performing a stateful test results in the larger number of candidates.

In the meantime, each test for a negative test in UE is expensive. Due to the nature of an over-the-air test, it is difficult to send many test messages. Moreover, when the UE fails to the connection procedure several times within a specific period, a connection from a test network is interrupted, and then a reconnection is interrupted fur a few seconds. Because these cases interfere with a normal attach procedure due to abnormal cases, such cases often occur in negative tests. Accordingly, only essential cases of negative tests need to be carefully selected.

Although it is possible to enumerate all negative test cases, it is difficult to determine a correct operation of the UE when receiving each test case. The reason is that there are many ambiguous sentences in the specification document, and the explanation of the operation is spread out over several documents with hundreds of pages. Oracle needs to determine implementation accuracy for each test case based on the corresponding behavior. However, in the specification document, it was found that it is vaguely stated whether the test case has been actually forbidden or invalid. Also, sentences regarding a single control procedure are defined in different places across a plurality of documents. This leads developers to misunderstand the specification document even at their best. Accordingly, considering the ambiguity and size of the specification document, it is difficult to build an oracle based on only the specification document.

To address these issues, the implicit state related to security is abstracted based on the specification document in an embodiment. In particular, according to an embodiment, it focuses on a part of the specification document that defines an operation of the UE depending on an authentication state. In an embodiment, the specification document defines the acceptance of a control plane message based on whether a security context is present. Accordingly, four abstract states are classified based on whether a security context of RRC and NAS is present. Note that this state is independently implemented and fully controllable in a network. This means that this definition is capable of being used for negative tests regardless of the default UE implementation.

The test message is generated based on the specification document. To reduce the huge search space in negative tests, the negative testing-based security analysis system according to an embodiment generates a test case based on the specification document, which includes all the points about negative cases. However, due to the size and complexity of the specification document, it is almost impossible to fully understand the specification document. To solve the issues, first of all, the negative testing-based security analysis system according to an embodiment extracts guidelines from the specification document by carefully analyzing the specification document and roughly generates a test case based on the guideline.

A deterministic oracle may be built as follows.

First of all, it is assumed that the negative test message of the negative testing-based security analysis system according to an embodiment needs to be deleted. Then, each message is verified by evaluating each message for a set of broad devices. When abnormal behavior is found based on the above-described assumption, the initial oracle is improved by identifying the specification document again. Because the negative testing-based security analysis system according to an embodiment has only a set of enumerable test cases, the improvement is possible.

Figure 4:
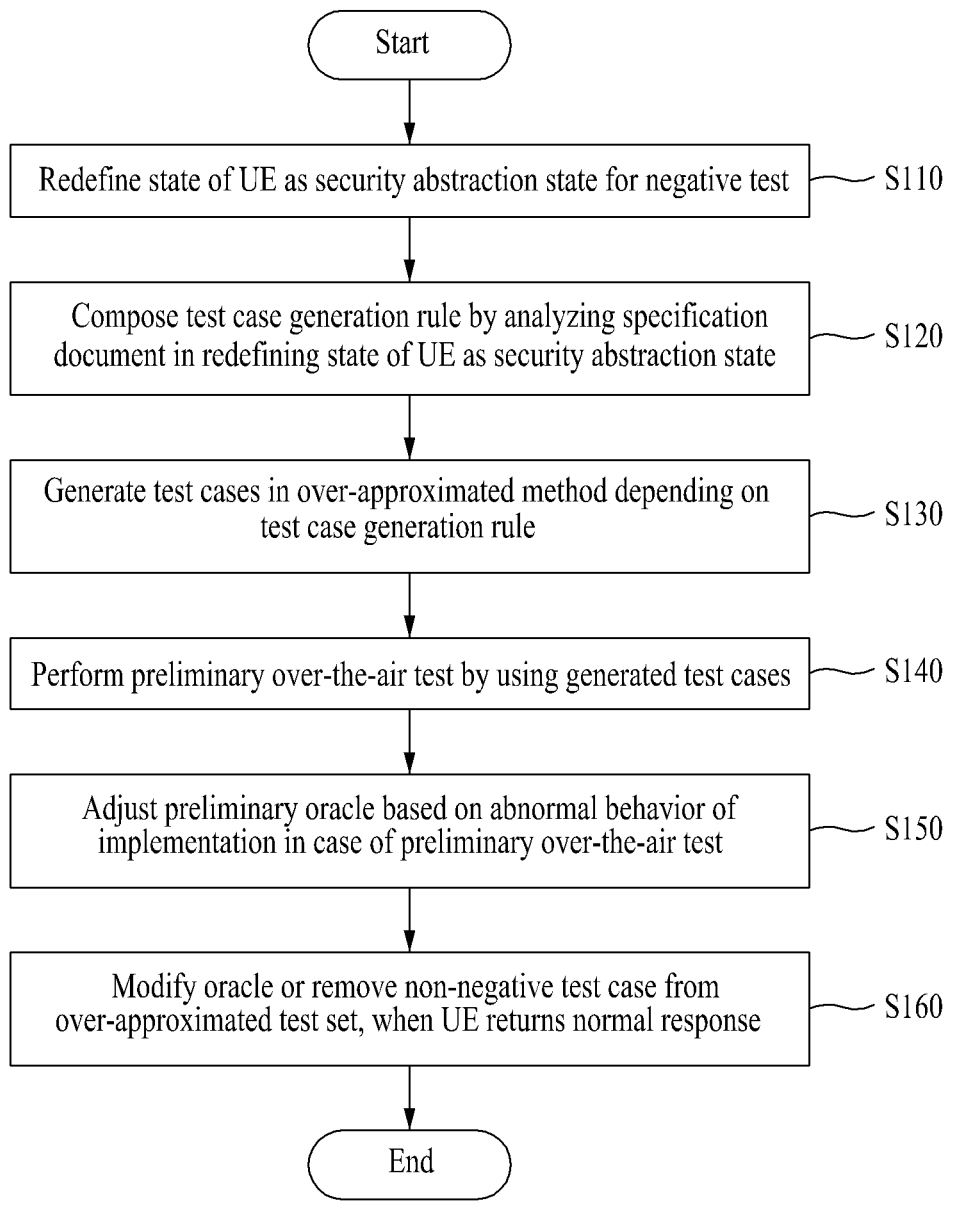
FIG. 4 is a flowchart illustrating a negative testing-based security analyzing method, according to an embodiment.

FIG. 4 is a flowchart illustrating a negative testing-based security analyzing method, according to an embodiment.

Referring to FIG. 4, a negative testing-based security analyzing method for protocol implementation of LTE device performed by a computer device according to an embodiment operation S110 of redefining a state of a UE as a security abstraction state for a negative test and operation S120 of composing a test case generation rule by analyzing a specification document in redefining the state of the UE as the security abstraction state.

Moreover, the method may further include operation S130 of generating test cases in an over-approximated method depending on the test case generation rule, operation S140 of performing a preliminary over-the-air test by using the generated test cases, operation S150 of adjusting a preliminary oracle based on an abnormal behavior of implementation in a case of the preliminary over-the-air test, and operation S160 of modifying an oracle or removing a non-negative test case from a set of test cases generated in the over-approximated method, when the UE returns a normal response. A negative test case may be finally obtained as a deterministic oracle.

Furthermore, the method may include extracting content and a format of a message, which is prohibited or should not be processed, from the test case generation rule obtained by analyzing the specification document and composing a test message from the extracted test case generation rule based on the content and the format of the message that is are prohibited or should not be processed such that one or more message components violate a specification. The test message may be used for negative testing of the UE based on the specification document.

Hereinafter, each operation of the negative testing-based security analyzing method according to an embodiment will be described.

The negative testing-based security analyzing method according to an embodiment may be described as an example of the negative testing-based security analysis system according to an embodiment.

Figure 5:
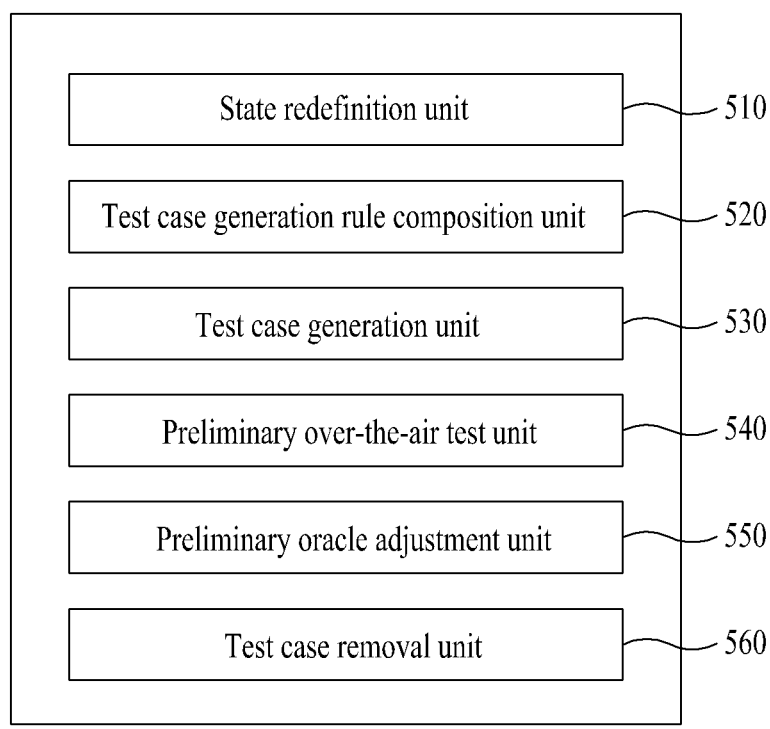
FIG. 5 is a block diagram illustrating a negative testing-based security analysis system, according to an embodiment.

FIG. 5 is a block diagram illustrating a negative testing-based security analysis system, according to an embodiment.

Referring to FIG. 5, a negative testing-based security analysis system 500 according to an embodiment may include a state redefinition unit 510 and a test case generation rule composition unit 520. Moreover, the negative testing-based security analysis system 500 may further include a test case generation unit 530, a preliminary over-the-air test unit 540, a preliminary oracle adjustment unit 550, and a test case removal unit 560.

In operation S110, the state redefinition unit 510 may redefine a state of a UE as a security abstraction state for a negative test.

The state redefinition unit 510 may redefine the state of the device based on a security context for each protocol.

For example, the state redefinition unit 510 may define the state of the UE as NO-SC based on a security context for each protocol. The NO-SC may be in a state where all control plane messages are protected depending on an event that only an initial wireless connection between the UE and a base station is present and the security context is not present.

As another example, the state redefinition unit 510 may define the state of the UE as N-SC based on a security context for each protocol. The N-SC may be in a state where an AKA procedure is completed and an NAS security context is generated. An RRC messages may not be protected depending on an event that all NAS messages are protected and an RRC security context is not generated.

As another example, the state redefinition unit 510 defines the state of the UE as NR-SC based on the security context for each protocol. The NR-SC is a state where a RRC security context is generated through an RRC security mode procedure. Accordingly, in the state, all RRC and NAS messages are protected. Because an FBS attacker, which is widely known in mobile communication, is incapable of generating a security context, the FBS attacker may not attack the UE in this state.

As another example, the state redefinition unit 510 defines the state of the device as REGI based on the security context for each protocol. The REGI is in a state after the UE completes all registration processes with a mobile communication network. In this state, the UE may also successfully generate a data bearer and the may use a mobile communication service such as a phone or data service.

In operation S120, the test case generation rule composition unit 520 may compose a test case generation rule by analyzing a specification document in redefining the state of the UE as the security abstraction state.

In operation S130, the test case generation unit 530 may generate test cases in an over-approximated method depending on the test case generation rule.

In operation S140, the preliminary over-the-air test unit 540 may perform a preliminary over-the-air test by using the generated test cases. By using at least one or more of the test EPC and the eNB for transmitting a test message to the UE in a specific state, the preliminary over-the-air test unit 540 may collect an output of the UE through a test, and may determine whether the UE exhibits an abnormal behavior, by using the collected output.

In operation S150, the preliminary oracle adjustment unit 550 may adjust a preliminary oracle based on an abnormal behavior of implementation in a case of the preliminary over-the-air test.

In operation S160, the test case removal unit 560 may modify an oracle or may remove a non-negative test case from a set of the test cases generated in the over-approximated method, when the UE returns a normal response.

Accordingly, a negative test case may be finally obtained as a deterministic oracle.

In the meantime, the system may include a device for extracting content and a format of a message, which is prohibited or should not be processed, from the test case generation rule obtained by analyzing the specification document and a device for composing a test message from the extracted test case generation rule based on the content and the format of the message that is are prohibited or should not be processed such that one or more message components violate a specification. At this time, the test message may be used for negative testing of a UE based on the specification document.

According to an embodiment, a negative testing-based security analyzing method for protocol implementation of an LTE device performed by a computer device includes extracting content and a format of a message, which is prohibited or should not be processed, from a test case generation rule obtained by analyzing a specification document and composing a test message based on the content and the format of the message extracted from the test case generation rule such that message components violate a specification. The test message may be used for negative testing of a UE based on the specification document.

The negative testing-based security analyzing method according to another embodiment may include a configuration of the negative testing-based security analyzing method according to the embodiment described above, and thus a redundant description will be omitted. In the meantime, the negative testing-based security analyzing method according to another embodiment may be performed by the negative testing-based security analysis system according to the embodiment described above.

Hereinafter, the negative testing-based security analyzing method and system according to an embodiment will be described in detail.

Figure 6:
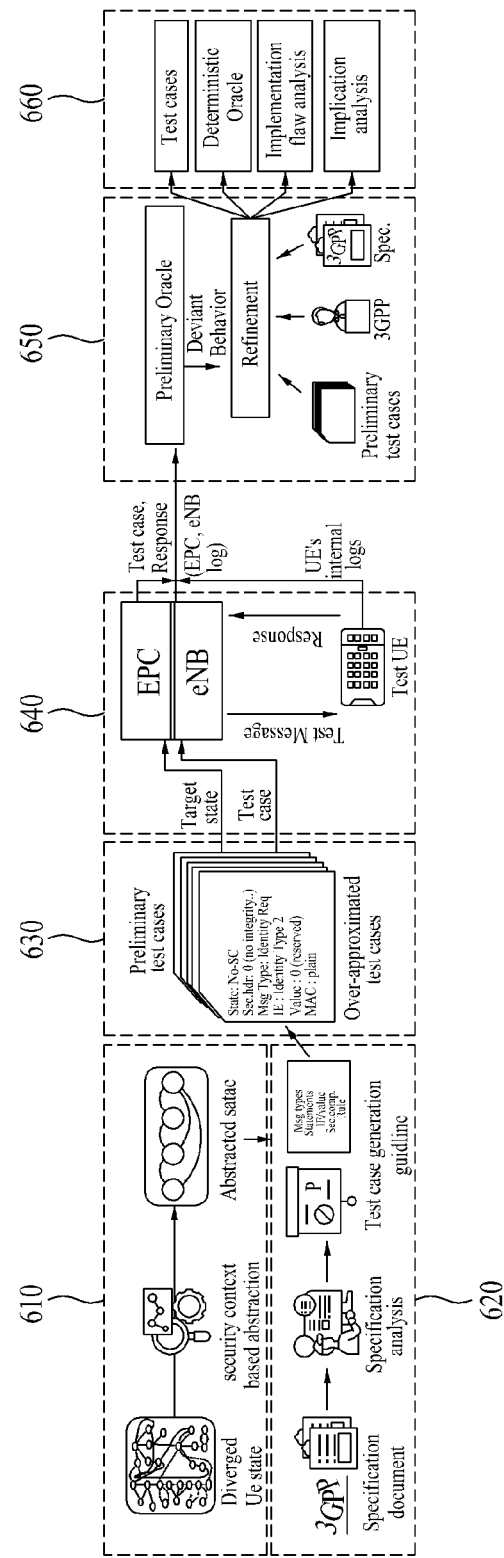
FIG. 6 is a diagram schematically illustrating a negative testing-based security analysis system, according to an embodiment.

FIG. 6 is a diagram schematically illustrating a negative testing-based security analysis system, according to an embodiment.

Referring to FIG. 6, a workflow of a negative testing-based security analysis system according to an embodiment is shown. The negative testing-based security analysis system according to an embodiment aims to compose a negative test case as a deterministic oracle. To this end, the negative testing-based security analysis system according to an embodiment performs the following process.

In operation 610, a conventional implicit UE state is redefined as a security abstraction state for a negative test. In operation 620, a test case generation rule, which is called a guideline, is composed by carefully analyzing the specification document by using this new state definition. In operation 630, the negative testing-based security analysis system according to an embodiment generates a test case according to a guideline. To resolve the ambiguity of the specification document, the negative testing-based security analysis system according to an embodiment enumerates test cases in an over-approximated method. In operation 640, the negative testing-based security analysis system according to an embodiment performs a preliminary over-the-air test by using a test case in an over-approximated method. For the test, the negative testing-based security analysis system according to an embodiment uses a test EPC/eNB for transmitting a test message to the UE in a specific state. Through the test, the negative testing-based security analysis system according to an embodiment collects an output (e.g., a response and an internal log of the UE) for each test UE. The negative testing-based security analysis system according to an embodiment determines whether the test UE exhibits an abnormal behavior, by using this output. In operation 650, the negative testing-based security analysis system according to an embodiment adjusts a preliminary test case and an oracle. When the UE exhibits the abnormal behavior in the preliminary test, the negative testing-based security analysis system according to an embodiment identifies the specification document again and determines an operation of complying with the specification through a discussion with a person in charge of 3GPP. In operation 660, when the corresponding operation does not have an error, the negative testing-based security analysis system according to an embodiment modifies the oracle or removes a non-negative test case from a set generated in the over-approximated method. Otherwise, the negative testing-based security analysis system according to an embodiment manually analyzes implementation flaws and the meaning thereof. After this improvement process, the negative testing-based security analysis system according to an embodiment may finally obtain a negative test case as a deterministic oracle.

Figure 7:
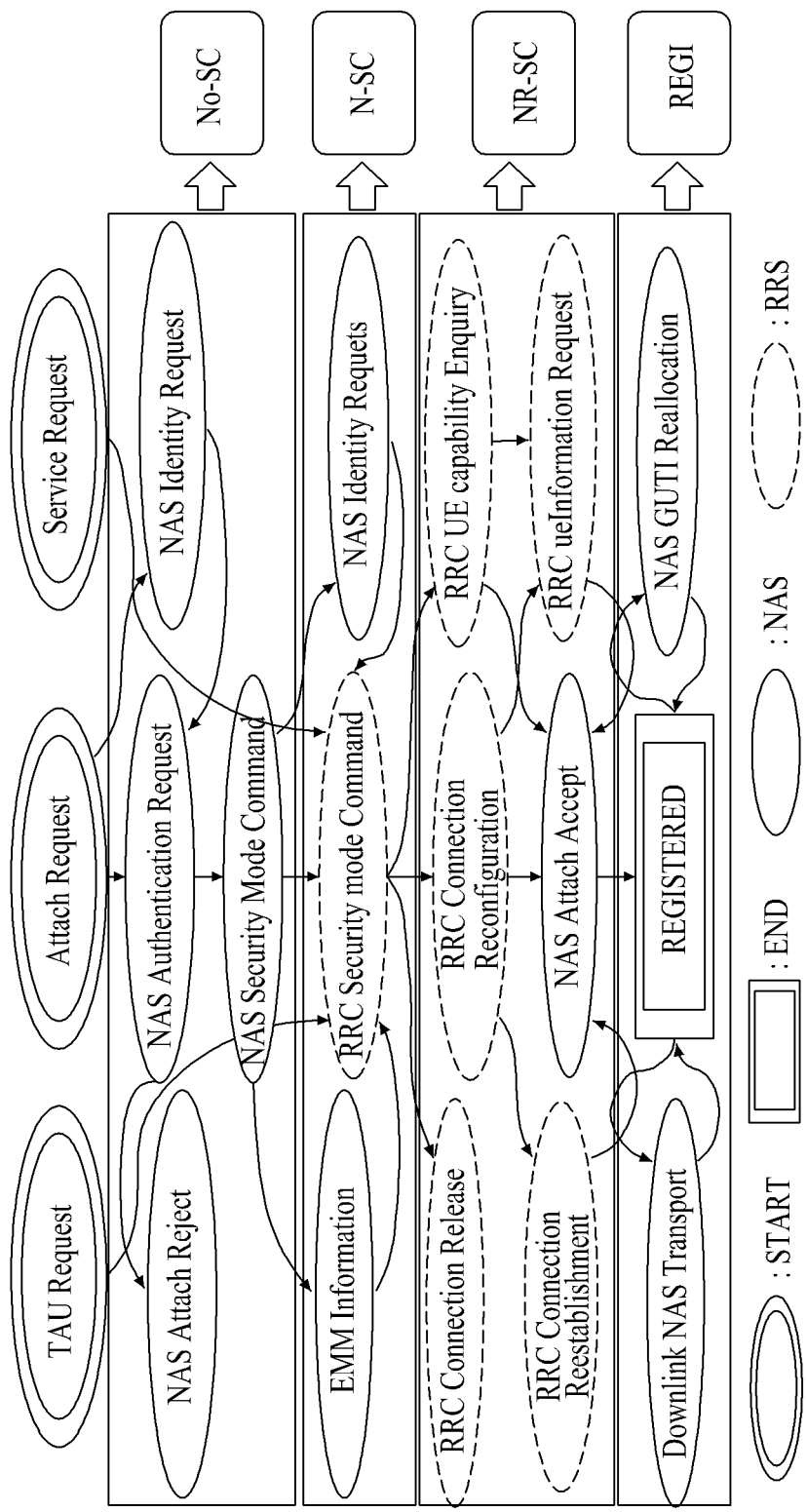
FIG. 7 is a diagram illustrating an abbreviated state machine for RRC and NAS protocols and a security abstraction state, according to an embodiment.

FIG. 7 is a diagram illustrating an abbreviated state machine for RRC and NAS protocols and a security abstraction state, according to an embodiment.

Here, it is possible to redefine a state in an LTE network for a negative test based on whether NAS and RRC security contexts are present. That is, the state corresponds to NO-SC, NR-SC, or REGI. As shown in FIG. 7, a state machine of a UE may be defined by using a control plane message from a network. However, assuming that the UE is capable of receiving an arbitrary message in all states, this expression may cause a state explosion. This assumption is valid in a hostile situation. Moreover, this state machine is independent of the existence of a security context. Accordingly, a negative testing-based security analysis system according to an embodiment newly defines a state of the UE based on the security context. Through a security abstraction state, the negative testing-based security analysis system according to an embodiment may discover various authentication logics changed based on whether the security context is present. Below, each state is described in a new definition.

NO-SC: in this state, only an initial wireless connection is established between the UE and an eNB without the security context. Accordingly, all control plane messages in this state are unprotected.

N-SC: after completing an AKA procedure, the UE switches to this state and a NAS security context is established. In this state, all NAS messages exchanged between the UE and the eNB are protected. However, an RRC message is still not protected because an RRC security context has not yet been established.

NR=SC: the UE switches to this state after the RRC security context is established together with the NAS security context. Accordingly, all RRC and NAS messages are protected in this state. In particular, an FBS attacker may not attack the UE in this state. The reason is that it may not help the UE to establish a security context with the network.

REGI: after completing the entire registration process for the LTE network, the UE finally enters this state. This state is the same as a REGISTERED state defined in the specification document. The UE in this state has been successfully set as a data bearer (EPS bearer). Accordingly, a cellular service such as a call and data service may be used.

As compared to the conventional explicit or implicit state definition, this new definition entails the following characteristics.

The abstracted state reflects characteristics of LTE security, where the existence of different security contexts allows different authentication logic for control plane messages. To comprehensively evaluate such the logic, three states (i.e., NO-SC, N-SC, and NR-SC) reflect the implicitly defined states of NAS/RRC together with various security contexts. Moreover, the state REGI is considered to reflect the explicit state of REGISTERED in the specification document. Even though it has the same security context as NR-SC, it is reasonable to consider REGI in particular because it has a unique operation for a specific message defined by the specification document. Table 1 shows how each threat model is related to the abstracted state.

TABLE 1

|  | No-SC | N-SC | NR-SC | REGI |
|---|---|---|---|---|
| NAS security context | X | ✓ | ✓ | ✓ |
| RRC security context | X | X | ✓ | ✓ |
| ATTACH accomplishment | X | X | X | ✓ |
| Reflected Threat model | F, M, I | F, M, I | M, I | M, I |

* F: FBS, M: MitM, I: Signal Injection

This new definition of the abstracted state helps to perform an implementation agnostic test. Because this state reflects a fundamental authentication procedure for LTE, it is possible to explicitly control a transition between states depending on the standardized LTE authentication operation. For example, the state of the UE may be changed from N-SC to NR-SC by sending an RRC SecurityModeCommand message in the test network. Accordingly, the negative testing-based security analysis system enables a stateful test for a plurality of devices regardless of implementation.

The negative testing-based security analysis system selectively and roughly generates a test message, which is invalid or prohibited by the specification document. As shown in FIG. 6, a test case generation rule called a guideline is established by carefully analyzing the specification document first.

In addition, according to an embodiment, the whole RRC and NAS specification documents are manually read to make a guideline. In particular, because aiming to discover security issues in LTE, the negative testing-based security analysis system has focused on a sentence related to message authentication. However, only the sentence is not sufficient. In addition, to write the guideline (e.g. there is a need to understand the corresponding IE for a message), other parts of the specification document need to be referenced.

Two auxiliary methods are used to review the analysis. First, a paragraph has been examined again focusing on important words for security: 'shall not', 'security activation', and 'integrity protection'. These words are essential to describe message authentication that negative testing-based security analysis systems mainly handles. Moreover, different versions of the specification document are compared with each other. Modifications may occur due to a security patch. In a process of implementing new features, this is based on the intuition that flaws are more likely to occur.

However, it is almost impossible to fully understand the specification document. Accordingly, ambiguity may be specified in the guideline. The negative testing-based security analysis system interprets this ambiguity excessively and generates a test case. This over-approximation frequently includes exceptions in the test case (i.e., a non-negative test case), and thus the negative testing-based security analysis system verifies these cases while composing the oracle.

According to one embodiment, the negative testing-based security analysis system carefully analyzes the specification document and generates a guideline for generating a negative test case. The guideline refers to a manual rule for generating a test case including all components of the test case consisting of a message type, an IE, a corresponding value, a security component (security header type and MAC), and a state. To resolve the ambiguity in the specification document, in the guideline, a wildcard may be specified to a component for specifying an arbitrary value. The procedure for generating this guideline is easier than fully understanding the specification document.

First, there is a need to select a message type for the guideline. Embodiments aim to evaluate security authentication in the UE. Accordingly, the focus is on a message that the UE should not accept without valid security protection (i.e., integrity protection). That is, the message (i.e. generic) that is not protected by design is excluded. As a result, 14 message types are considered to test both NAS and RRC. This may be seen in Table 2.

TABLE 2

| | | State | | | | | |
|---|---|---|---|---|---|---|---|
| Protocol | Message | No-SC | N-SC | NR-SC | REGI | All | Implication |
| RRC | RRCConnectionReconfiguration | I1(2), I1 | | M2 | | — | AKA bypass (I1), Location leak (I1, M2) |
| | RRCConnectionRelease | — | | M2 | | — | Redirection attack (M2) |
| | SecurityModeCommand | I2, I3 | | — | | — | Eavesdropping (I2, I3) |
| | UECapabilityEnquiry | — | | M2 | | — | Information leak (M2) |
| | CounterCheck | M1 | | M2 | | — | Information leak (M2) |
| | UEInformationRequest | M1 | | M2 | | — | Location leak (M1, M2) |
| | DLInformationTransfer | — | | M2 | | — | — |
| NAS | Identity Request | I2, I3 | | — | | S1, S2(2) S3 | Information leakage (S1, S2, I2, I3) |
| | Security Mode Command | I3 | | — | | — | Eavesdropping (I3) |
| | GUTI Reallocation Command | | | — | | S1 | Identity spoofing (S1), Denial-of-Service (S1) |
| | EMM Information | — | S1 | | | — | NITZ spoofing (S1) |
| | Downlink NAS Transport | | — | | S1 | — | SMS phishing (S1) |
| | Attach Reject | S2, I2 | | — | | S1 | Denial-of-Service |

TABLE 2-continued

| | | State | | | | | |
|---|---|---|---|---|---|---|---|
| Protocol | Message | No-SC | N-SC | NR-SC | REGI | All | Implication |
| | | | | | | | (S1, S2, I2) |
| | Attach Accept | | | — | | — | — |

The guideline for generating a negative test case is generated for each message type. To this end, first of all, the negative testing-based security analysis system carefully analyzes the specification document and identifies a sentence for explicitly forbidding a specific message. Then, the negative testing-based security analysis system converts the sentence to generate a guideline manually. There are three rules for this change.

When a specific component is not explicitly mentioned in the specification document, the guideline adds all possible values to candidate values (e.g., a wildcard).

When the specification document defines an invalid or forbidden value for an element, the guideline adds the value to a candidate item.

When the specification document defines a value accepted for an element, the guideline adds a complementary set of elements to the candidate item. As a result, 17 guidelines are generated in the specification document.

FIG. 8 is a diagram illustrating a guideline for an ID request test message, according to an embodiment.

Referring to FIG. 8, a method of generating a guideline from a specification document by using an identity request as an example is shown. As seen from a top part of FIG. 8, the specification document allows only a UE to process a specific message by without an integrity test. There is an additional restriction that one of these messages is an identity request, the requested identification parameter (i.e., Identity type 2) of a message needs to be IMSI, and a value thereof needs to be 1. It is possible to establish a guideline for the identity request depending on the rules described above. In this guideline, there is a complementary set for Identity type 2 for excluding a specific value (IMSI) from a candidate. In addition, it is possible to set an arbitrary value (e.g., a wildcard) for the remaining components such as a state, a security header type, and MAC. This reflects the above specification document. It is specified that the identity request without IMSI needs to be always protected. In other words, the UE does not need to receive such a message in any combination of the remaining elements. Accordingly, to comprehensively evaluate the authentication logic of the UE, the negative testing-based security analysis system considers all possible combinations.

As another example, the fourth guideline in Table 3 is derived from a sentence of "the E-UTRAN may configure the UE to perform measurement reporting, but the UE only sends the corresponding measurement reports after successful security activation". This configuration is processed by an RRCConnectionReconfiguration message using a measConfig IE. Accordingly, the guideline is used to verify whether the UE correctly tests integrity together with this message.

TABLE 3

| | | | Guideline | | | | | |
|---|---|---|---|---|---|---|---|---|
| Protocol | No. | State | Security Header Type | Message Type | IE | MAC | Reference | # of test cases for each state | Page # |
| RRC | 1 | * | N/A | RRCConnection-Reconfiguration | drb-ToAddModList: {...} | * | A.6 5.3.1.1 in [7] | 2 | 68p |
| | 2 | * | N/A | RRCConnection-Reconfiguration | srb-ToAddModList: {SRB2} | * | A.6 5.3.1.1 in [7] | 2 | 39p |
| | 3 | * | N/A | RRCConnection-Reconfiguration | measConfig: {...} | * | A.6 5.5.5.1 in [7] | 2 | 68p |
| | 4 | * | N/A | RRCConnection-Reconfiguration | mobilityControlInfo:{...} securityConfigHO: {...} | * | A.6 5.6.5.1 in [7] | 2 | 918p, 72p |
| | 5 | * | N/A | RRCConnectionRelease | ... | * | A.6 in [7] | 2 | 918p |
| | 6 | * | N/A | SecurityModeCommand | intergrityProtection: {EIA1, EIA2, EIA3}$^C$ | * | A.6 5.3.1.2 in [7] | 10 | 70p |
| | 7 | * | N/A | UECapabilityEnquiry | ... | * | A.6 5.6.3.2 in [7] | 2 | 230p |
| | 8 | * | N/A | counterCheck | ... | * | A.6 in [7] | 2 | 918p |
| | 9 | * | N/A | UEInformationRequest | ... | * | A.6 5.6.5.2 in [7] | 2 | 919p |
| | 10 | * | N/A | DLInformationTransfer | ... | * | A.6 in [7] | 2 | 918p |
| NAS | 11 | * | * | IdentityRequest | Identity Type2: {IMSI}$^C$ | * | 4.4.4.2 in [4] | 124 | 50p, 51p |
| | 12 | * | * | Security Mode Command | integrityProtAlgorithm: {EIA1, EIA2, EIA3}$^C$ | * | 4.4.4.1, 4.4.4.2 in [4] | 155 | 50p |
| | 13 | * | * | GUTI Reallocation Command | ... | * | 4.4.4.2 in [4] | 31 | 50p, 51p |
| | 14 | * | * | EMM Information | ... | * | 4.4.4.2 in [4] | 31 | 50p, 51p |
| | 15 | * | * | Downlink NAS Transport | ... | * | 4.4.4.2 in [4] 4.4.4.2, | 31 | 50p, 51p |
| | 16 | * | * | Attach Reject | EMM cause: {#25} | * | 5.5.1.2.5 in [4] | 31 | 50p, 51p, 129p |
| | 17 | * | * | Attach Accept | ... | * | 4.4.4.2 in [4] | 31 | 50p, 51p |

The generation of a test case in an over-approximated method will be described below.

The negative testing-based security analysis system organizes all test messages according to the guideline as shown in FIG. 8 after completely generating the guideline. In particular, to make a test case, the negative testing-based security analysis system selects one of candidate values from each element. For information element and security header component, the negative testing-based security analysis system uses a predefined available value. In a case of MAC, the negative testing-based security analysis system uses zero MAC (i.e., no integrity) and random MAC (i.e., compromised integrity) for candidates. Because there are some exceptions in the enumeration according to one embodiment, this operation is an over-approximation. The negative testing-based security analysis system may detect these exceptions by observing operations of several implementations. Finally, a total of 1,848 test cases are generated from 17 guidelines shown in Table 3.

The over-the-air test is described below.

The negative testing-based security analysis system performs the generated test cases by using an over-the-air test framework.

As shown in FIG. 6, the over-the-air test consists of a test EPC/eNB and a test UE. To implement the test EPC/eNB, the modified version of srsLTE (version released in September 2019) together with USRP B210 is used as a software-defined wireless device. The test UE is equipped with a programmable SIM card (ISIM-SJA2 or SIM-SJS1-4FF). The log of the baseband of the test device is obtained by using a diagnostic message (DM) monitoring tool. The system log of the test device is obtained by using the android debug bridge (ADB). While performing the test case, the air interface and test UE use a Faraday cage to avoid interference with commercial networks and users.

With respect to each test case consisting of a test message and an abstract state, the negative testing-based security analysis system first moves the state of the UE under test to a target state, transmits a test message, and collects responses to find bugs. To change the state of the UE, the negative testing-based security analysis system follows a standard authentication procedure in LTE. The EPC/eNB transmits a security mode command from NAS, RRC for N-SC and NR-SC, and an attach accept message for REGI. Next, the EPC/eNB transmits a test message to the UE, and the negative testing-based security analysis system collects a response of the UE (if any) together with an internal log message found through DM and ADB. Reactions and logs are used to build a deterministic oracle.

For efficiency of an over-the-air test, the negative testing-based security analysis system may reduce the overhead for a repetitive state transition. The state transition is performed only with a special message such as a security mode command or attach accept. In other words, according to an embodiment, when the UE receives any message other than one of these special messages, it may be guaranteed that the state of the UE is maintained as it is. The negative testing-based security analysis system allows the UE to continuously execute several messages without returning to NO-SC, which is an initial state, by using this attribute. This enables the negative testing-based security analysis system to reduce the time-consuming procedure of rebooting the UE by calling an airplane mode when all test cases are executed.

However, this does not mean that the negative testing-based security analysis system is capable of transmitting the unlimited number of test messages at once. The specification document defines that all messages should be processed in a specific time slot. Otherwise, the UE automatically disconnects the connection and increments an attempt counter. When this attempt counter exceeds a threshold, the UE remains in a disconnected state for 12 minutes (i.e., T3402), resulting in test delay. Accordingly, the negative testing-based security analysis system restricts the number of consecutive test cases. Experientially, the current prototype of the negative testing-based security analysis system sends only 6 messages to a session to avoid this issue.

The negative testing-based security analysis system takes several hours to test all 1,848 test messages due to an over-the-air test. It was observed that a test for each session takes about 10 seconds and the whole test takes an average of 8 hours. This test time depends on a device being tested. There are many reasons for spending so much time. First, the negative testing-based security analysis system needs to wait for a few seconds to determine whether the UE does not respond to a test message. One of the most common reactions to a negative message is to unconditionally reject the message. To distinguish unconditionally rejecting the message from slowing down the response, it is possible to use a timeout (2 seconds for prototype) required to delay the whole test. Second, the UE often stops reconnecting to a test framework after disconnection. This situation lasts for several minutes due to the wireless environment or internal logic of a UE. To escape from this situation, the interruption is manually triggered to reset an airplane mode occasionally. This idle time accounts for 70% or more of the whole test.

Hereinafter, a method of building a deterministic oracle will be described.

The negative testing-based security analysis system builds a deterministic oracle for overcoming the ambiguity in understanding the specification document. In particular, the negative testing-based security analysis system first makes and improves an initial assumption to build an oracle.

In the initial assumption, the negative testing-based security analysis system initially assumes that the UE needs to automatically delete all test messages. The reason is that it constitutes an explicitly prohibited or invalid test message depending on the specification document.

In the improvement procedure, the negative testing-based security analysis system adjusts a preliminary oracle based on an abnormal behavior of implementation. Hereinafter, the improvement procedure according to an operating type deviating from a normal range is shown.

When the UE returns a normal response, this means that the UE has implementation flaws, or the message is an exception in the specification document. To check this, when the UE receives a test message, it is possible to examine every part of the specification document that defines how the UE operates. Then, it is determined whether a current response conforms to the specification. Because this test case is a positive case when the specification document allows this test case as an exception, this case is removed from the set generated in the over-approximated method. Otherwise, it is regarded as an implementation flaw and the meaning thereof is further analyzed. Finally, even after the specification document is identified, an operation of conforming to the specification may not be identified because the specification document is ambiguous. In this case, the operation of conforming to the specification is understood through a discussion with a person in charge of 3GPP.

When the UE sends a rejection message or an error message, it is further determined whether the UE instructs the specification document to use a specific rejection message or a specific error message. In this case, an oracle is modified to regard a correct operation as sending the corresponding message and to regard another operation as non-compliance with the specification. The oracle is improved to ignore a rejection response when an operation of conforming to the specification for a test case is not defined.

When the UE does not respond, the specific message type is additionally identified in a specific internal log of the UE. Essentially, this message type has no response depending on the specification document. These message types include Attach reject, EMM information, and RRC Connection Release. Because this message type is capable of changing the internal state of the UE, DM or ADB information collected from a test framework of the negative testing-based security analysis system is used to determine whether the message is actually rejected. When the UE changes the state similarly to the first case, the UE examines the specification document related to the test case and identifies an operation of conforming to the specification. As described above, the detailed logic for processing these messages has been explained. Except for these three message types, other message types explicitly have the corresponding response message when the transmitted test message is processed. Accordingly, in the case of such a message type, the negative testing-based security analysis system may determine the rejection of the UE for the message without monitoring the state of the UE.

During the improvement procedure, the negative testing-based security analysis system may successfully process a message for returning a rejection response such as Security Mode Failure, EMM status, or RRC ConnectionReestablishmentRequest. Moreover, the negative testing-based security analysis system removes a positive case from the over-approximation related to the identity request. Finally, the three ambiguities of the specification document and the two types of unspecified rejection behavior may be improved.

The foregoing devices may be realized by hardware elements, software elements and/or combinations thereof. For example, the devices and components described in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be embodied in any type of machine, components, physical equipment, virtual equipment, computer storage media or devices so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described example embodiments may be recorded in computer-readable media including program instructions to implement various operations embodied by a computer. The computer-readable medium may also include the program instructions, data files, data structures, or a combination thereof. The program instructions recorded in the media may be designed and configured especially for the example embodiments or be known and available to those skilled in computer software. The computer-readable medium may include a hardware device, which is specially configured to store and execute program instructions, such as magnetic media (e.g., a hard disk drive and a magnetic tape), optical recording media (e.g., CD-ROM and DVD), magneto-optical media (e.g., a floptical disk), read only memories (ROMs), random access memories (RAMs), and flash memories. Examples of computer programs include not only machine language codes created by a compiler, but also high-level language codes that are capable of being executed by a computer by using an interpreter or the like.

While embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

According to embodiments, it is possible to provide a negative testing-based security analysis system and method for protocol implementation of an LTE device that may define a state where a device is to be tested based on whether a security context is present, may generate a message used for negative testing based on a specification document, and may handle a correct operation (oracle) of a device suitable for a specification for the message.

According to embodiments, it is possible to provide a negative testing-based security analysis system and method for protocol implementation of LTE devices that may find and patch security vulnerabilities in protocol implementation for conventional mobile communication devices and newly released devices.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A negative testing-based security analyzing method for protocol implementation of a long term evolution (LTE) device performed by a computer device, the method comprising:

redefining a state of user equipment (UE) as a security abstraction state for a negative test;

composing a test case generation rule by analyzing a specification document in redefining the state of the UE as the security abstraction state, and implementing the test case generation rule on the LTE device, wherein, the security abstraction state comprises NO-SC, N-SC, NR-SC, and REGI, wherein NO-SC is a state where all control plane messages are protected depending on an event that only an initial wireless connection between the UE and a base station is present and the security context is not present, wherein N-SC is a state where an authentication and key agreement (AKA) procedure is completed and a Non Access Stratum (NAS) security context is generated, wherein NR-SC is a state to which the UE switches after a Radio Resource Control (RCC) security context is established together with the NAS security context such that all RCC and NAS messages are protected, and wherein REGI is a state entered by the UE after completing a registration process for an LTE network.

2. The method of claim 1, further comprising:

generating test cases in an over-approximated method depending on the test case generation rule;

performing a preliminary over-the-air test by using the generated test cases;

adjusting a preliminary oracle based on an abnormal behavior of implementation in a case of the preliminary over-the-air test; and when the UE returns a normal response, modifying an oracle or removing a non-negative test case from a set of the test cases generated in the over-approximated method, wherein a negative test case is finally obtained as a deterministic oracle.

3. The method of claim 1, wherein the redefining of the state of the UE as the security abstraction state includes:

redefining the state of the UE based on a security context for each protocol.

4. The method of claim 1, wherein the redefining of the state of the UE as the security abstraction state includes:

defining the state of the UE as NO-SC based on a security context for each protocol.

5. The method of claim 1, wherein the redefining of the state of the UE as the security abstraction state includes:

defining the state of the UE as N-SC based on a security context for each protocol, and wherein an RRC messages is not protected depending on an event that all NAS messages are protected and an RRC security context is not generated.

6. The method of claim 1, further comprising:

extracting content and a format of a message, which is prohibited or should not be processed, from the test case generation rule obtained by analyzing the specification document; and composing a test message based on the content and the format of the message extracted from the test case generation rule such that one or more message components violate a specification, wherein the test message is used for negative testing of the UE based on the specification document.

7. A negative testing-based security analysis system for protocol implementation of a long term evolution (LTE) device, the system comprising:

a state redefinition unit configured to redefine a state of a user equipment (UE) as a security abstraction state for a negative test; and a test case generation rule composition unit configured to compose a test case generation rule by analyzing a specification document in redefining the state of the UE as the security abstraction state, and implementing the test case generation rule on the LTE device, wherein, the security abstraction state comprises NO-SC, N-SC, NR-SC, and REGI, wherein NO-SC is a state where all control plane messages are protected depending on an event that only an initial wireless connection between the UE and a base station is present and the security context is not present, wherein N-SC is a state where an authentication and key agreement (AKA) procedure is completed and a Non Access Stratum (NAS) security context is generated, wherein NR-SC is a state to which the UE switches after a Radio Resource Control (RCC) security context is established together with the NAS security context such that all RCC and NAS messages are protected, and wherein REGI is a state entered by the UE after completing a registration process for an LTE network.

8. The system of claim 7, further comprising:

a test case generation unit configured to generate test cases in an over-approximated method depending on the test case generation rule;

a preliminary over-the-air test unit configured to perform a preliminary over-the-air test by using the generated test cases;

a preliminary oracle adjustment unit configured to adjust a preliminary oracle based on an abnormal behavior of implementation in a case of the preliminary over-the-air test; and a test case removal unit configured to modify an oracle or to remove a non-negative test case from a set of the test cases generated in the over-approximated method, when the UE returns a normal response, wherein a negative test case is finally obtained as a deterministic oracle.

9. A negative testing-based security analyzing method for protocol implementation of a long term evolution (LTE) device performed by a computer device, the method comprising:

extracting content and a format of a message, which is prohibited or should not be processed, from a test case generation rule obtained by analyzing a specification document; and composing a test message based on the content and the format of the message extracted from the test case generation rule such that one or more message components violate a specification.

10. The method of claim 9, wherein the test message is used for negative testing of a user equipment (UE) based on the specification document.

* * * * *